United States Patent
Zylstra et al.

(10) Patent No.: US 8,395,065 B2
(45) Date of Patent: Mar. 12, 2013

(54) PORTABLE REMOTE RACKING DEVICE FOR A CIRCUIT BREAKER

(75) Inventors: Henry J. Zylstra, Alburnett, IA (US); Jesil Pujara, Madison, WI (US); Gary A. Volesky, Newhall, IA (US); Robert F. Dvorak, Mt. Vernon, IA (US)

(73) Assignee: Schneider Electric USA, Inc., Palatine, IL (US)

( * ) Notice: Subject to any disclaimer, the term of this patent is extended or adjusted under 35 U.S.C. 154(b) by 394 days.

(21) Appl. No.: 12/874,835

(22) Filed: Sep. 2, 2010

(65) Prior Publication Data

US 2012/0055765 A1 Mar. 8, 2012

(51) Int. Cl.
*H01H 9/20* (2006.01)
(52) U.S. Cl. .................................................. 200/50.24
(58) Field of Classification Search ............... 200/50.24
See application file for complete search history.

(56) References Cited

U.S. PATENT DOCUMENTS

| | | | | |
|---|---|---|---|---|
| 4,427,854 | A * | 1/1984 | Kleinecke et al. | 200/50.21 |
| 4,693,132 | A | 9/1987 | Buxton et al. | |
| 5,453,587 | A * | 9/1995 | Hurley et al. | 200/50.24 |
| 5,477,017 | A | 12/1995 | Swindler et al. | |
| 5,725,085 | A * | 3/1998 | Seymour et al. | 200/50.33 |
| 6,160,229 | A | 12/2000 | Grelier et al. | |
| 6,777,627 | B1 * | 8/2004 | Stevenson | 200/50.21 |
| 6,951,990 | B1 | 10/2005 | Miller | |
| 7,019,228 | B2 | 3/2006 | Anger et al. | |
| 7,019,230 | B1 | 3/2006 | Vaill et al. | |
| 7,964,809 | B2 * | 6/2011 | Sapuram et al. | 200/50.21 |
| 8,261,433 | B1 * | 9/2012 | Ledbetter et al. | 29/764 |
| 2009/0014291 | A1 | 1/2009 | Stevenson | |
| 2011/0062002 | A1 * | 3/2011 | Hawkins et al. | 200/50.24 |
| 2012/0055765 | A1 * | 3/2012 | Zylstra et al. | 200/50.24 |
| 2012/0193193 | A1 * | 8/2012 | Niedzwiecki | 200/50.24 |

FOREIGN PATENT DOCUMENTS

EP 0986153 A1 10/2005

OTHER PUBLICATIONS

International Search Report corresponding to co-pending International Patent Application Serial No. PCT/US2011/048898, European Patent Office, date Aug. 24, 2011; (4 pages).
International Written Opinion corresponding to co-pending International Patent Application Serial No. PCT/US2011/048898, European Patent Office, dated Aug. 24, 2011; (8 pages).
CBS ArcSafe RRS-1 (Remote Racking System) Technical Manual; dated 2009; (69 pages).
CBS ArcSafe Remote Racking Systems for Circuit Breakers http://www.remotereackingsolutions.com/; dated 2008 (1 page).

* cited by examiner

*Primary Examiner* — Briggitte R Hammond
(74) *Attorney, Agent, or Firm* — Nixon Peabody LLP

(57) ABSTRACT

A portable, remote racking device that is controlled by a remote control. The remote racking device includes a drive that fits into a corresponding crank access hole formed in a front panel of a cradle housing a circuit breaker installed into a switchgear. The drive turns a mechanism inside the cradle that causes the circuit breaker to be racked into or out of the switchgear. The remote racking device includes an actuator pin that abuts a corresponding button arm protruding through the front panel. The remote control includes a control for depressing the button arm and another control for causing a motor to rotate the drive. The actuator pin detects when the button arm pops out of the panel, and a circuit in the remote racking device briefly reverses the motor to bring it and the circuit breaker to a sudden stop, preventing the mechanical linkages of the mechanism from locking-up or becoming damaged and avoiding over-torquing the motor.

20 Claims, 10 Drawing Sheets

PORTABLE REMOTE RACKING DEVICE FOR A CIRCUIT BREAKER

FIELD OF THE INVENTION

The present disclosure relates to remote racking systems for electrical switchgear/board equipment, and, more particularly, to a portable remote racking device with a remote control device for racking a circuit breaker into or out of electrical switchgear/board equipment.

BACKGROUND

Electrical switchgear/board equipment (sometimes just called switchgear or switchboard) house very large and heavy circuit breakers that protect loads that can consume thousands of amps of current. The procedure for making or breaking the electrical connections inside the electrical equipment between primary current carrying connectors in the circuit breaker and the corresponding connectors in the switchgear is referred to as racking. Racking such high-capacity circuit breakers is a procedure wrought with personal danger to the operator's safety. A possibility always exists that an explosion will occur due to a fault creating an arc flash, causing significant injury, including burns, or even death to the operator. Existing racking systems require the operator to insert a hand crank called a racking handle into a panel of a cradle or enclosure housing the circuit breaker to rack a circuit breaker into and out of the switchgear/board. This puts the operator right in front of the circuit breaker enclosure. Other existing racking systems use a wheeled platform that is positioned in front of the circuit breaker. A racking device is placed on the wheeled platform and mechanically couples with a control screw in the switchgear, which is cranked by the racking device.

A circuit breaker can be racked into or out of the switchgear among various positions, including a connected, test, and disconnected positions. When the circuit breaker is racked from one position to another (e.g., from a disconnected to a test position), a safety system in the switchgear typically prevents a further racking operation to be performed until the operator affirmatively signals an intention to perform the next racking operation (e.g., from the test position to a connected position). In some systems, the operator must press a stop/release button to perform the next racking operation. This button is accessible from the front panel of the switchgear, which places the operator in close proximity to the switchgear and within range of a harmful and potentially deadly arc flash explosion. Allowing the operator to perform various racking operations while maintaining a safe distance from the circuit breaker is desirable.

BRIEF SUMMARY

This disclosure presents, among other things, a remote racking system that allows an operator to rack a circuit breaker safely into and out of a switchgear. A switchgear is a large metal enclosure that houses multiple circuit breakers that protect loads carrying very high levels of current. These circuit breakers are very heavy and bulky, much larger than those typically found in residential homes. Some of these circuit breakers can weigh over 100 pounds. Each circuit breaker is housed within a cradle, which is itself an enclosure, typically composed of metal, which has a panel accessible from a front of the circuit breaker. Inside the cradle is a mechanism that allows the operator to "rack" or slide the heavy circuit breaker into and out of switchgear. This operation is typically carried out by a hand crank that is inserted into a hole in the front panel, and then turned by the operator, which operates the mechanism to slide the circuit breaker into and out of the switchgear. As an added safety measure, the operator is also required to depress a button arm (also called a stop/release button) that protrudes through the front panel before turning the crank. The cradle also houses primary electrical connectors which in turn are connected to the primary connectors of switchgear. On the back of the circuit breaker are electrical connectors that connect to corresponding electrical connectors in the cradle inside the switchgear, thereby connecting the circuit breaker between a power source and a load to be protected.

The racking operation, as it is called, ensures reliable connections and disconnections are made between the electrical connectors on the circuit breaker and the corresponding connectors on the cradle inside the switchgear. In order to perform racking operation, the operator attaches and then locks in place a remote racking device to the front of the panel of the cradle. The remote racking device has a spring-loaded drive shaft that goes into the hole where the manual crank is normally inserted and an actuator pin that goes right up against the protruding button arm in the panel of the cradle. The remote racking device is connected to a remote control device by an electrical cable that is long enough to allow the operator to operate the remote racking device a safe distance away from the circuit breaker. The remote control device includes a number of buttons or switches that can control the operation of the remote racking device, which in turn operates on the cradle mechanism inside the cradle to cause the circuit breaker to be racked into or out of the cradle in the switchgear.

To initiate a racking operation, the operator depresses a button or switch on the remote control device that causes the actuator pin to depress the button arm of the cradle mechanism, thereby simulating the manual action by the operator who would normally use a finger to depress the button arm. Then, the operator pushes another button or switch on the remote control device to start a racking operation. A signal is sent over the electrical cable to the remote racking device, which begins to turn the motor in a direction indicated by the operator via the remote control device. The motor turns the drive, which cranks the cradle mechanism, causing the circuit breaker to rack in or out of the switchgear. When the mechanism inside the cradle reaches the next stopping position, the button arm pops out, which pushes the actuator pin in the remote racking device back into the remote racking device, engaging a switch that sends an input signal to a circuit inside the remote racking device. When the circuit receives this input signal, it produces an output signal in the form of an electrical pulse that causes the motor to stop and briefly reverse itself, bringing the motor and the accompanying circuit breaker to a sudden stop. This prevents the mechanical linkage of the cradle mechanism inside the switchgear from locking up and also prevents damage to the cradle mechanism inside the switchgear. Normally, the motor, which is connected to a heavy load, has an inertia that wants to continue to apply rotational energy even after power is removed. By reversing the motor briefly when the button arm pops out, this inertia can be overcome, effectively slamming the brakes on the motor and the accompanying movement of the circuit breaker.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1A:
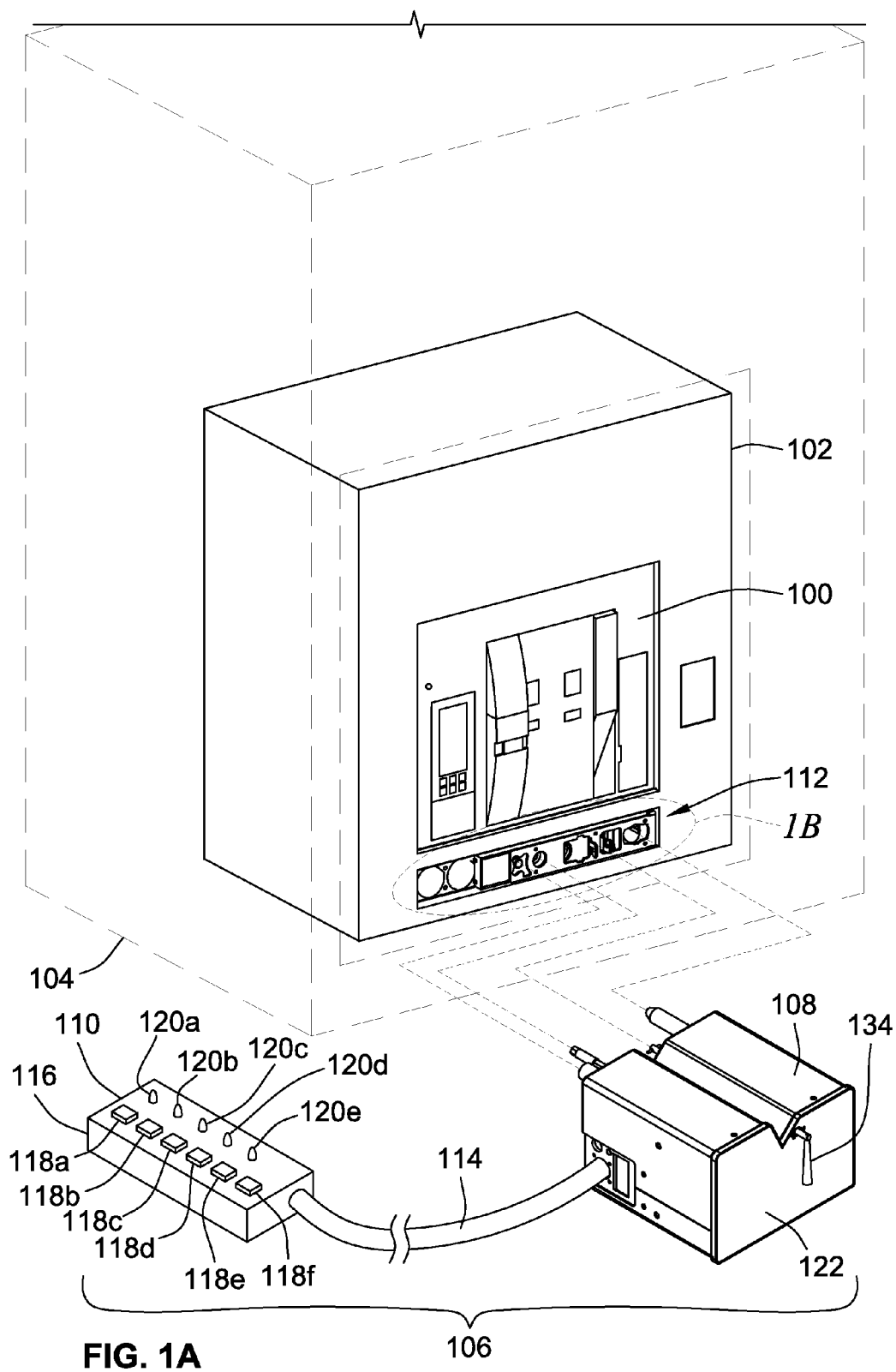
FIG. 1A is a perspective exploded view of a circuit breaker installed in a cradle within an electrical switchgear and a remote racking device connected to a remote control device.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the invention as defined by the appended claims.

DETAILED DESCRIPTION

FIG. 1A is a perspective view of a circuit breaker 100 housed within a cradle or enclosure 102 for use in electrical switchgear equipment (or switchgear/board) 104 and a remote racking system 106. The switchgear/board 104 can have a high, medium, or low voltage rating as defined by the American National Standards Institute (ANSI) or can refer to a "switchboard" as defined in Underwriters Laboratory Standard UL891. The terms switchgear and switchboard are referred to interchangeably and synonymously herein and refer to the same device. A non-limiting example of a suitable circuit breaker 100 for use in connection with aspects of the present disclosure is the MASTERPACT® circuit breaker available from Schneider Electric. The remote racking system 106 includes a portable, remote racking device 108 and a remote control device 110, which is not drawn to scale in FIG. 1A but rather has been enlarged for ease of illustration. The cradle 102 includes a front panel 112 that is accessible from a front of the switchgear 104. An electrical cable 114 connects the remote racking device 108 with the remote control device 110. The electrical cable 114 conventionally includes multiple wires insulated from one another, each carrying power, control, data, or other electrical signals between the remote racking device 108 and the remote control device 110. The remote control device 110 includes a housing 116 and multiple controls 118, such as switches, and indicators 120, such as light emitting diodes, for example.

The circuit breaker 100 is installed into the switchgear 104 and can be racked into or out of the switchgear 104 among at least two, typically three racking positions. The details of the conventional components including the cradle mechanism involved in this racking operation are not necessary for the present disclosure; however, exemplary details can be found in U.S. Pat. No. 6,160,229, which is incorporated herein by reference in its entirety. These components are housed within the cradle 102, and cause the circuit breaker 100 to be racked among multiple racking positions, such as Disconnect, Test, and Connect positions. The disconnect position is sometimes also referred to as the "remove" position because the circuit breaker 100 can be safely removed from the switchgear 104, the electrical conductors of the circuit breaker 100 having been disconnected from corresponding busbars in the switchgear 104. In the connected position, the electrical conductors of the circuit breaker 100 are connected to the busbars of the switchgear 104, allowing current to flow between an energy source, through the circuit breaker 100, and to one or more loads protected by the circuit breaker 100. In the test position, the electrical conductors are not physically connected to the busbars of the switchgear 104, but other electrical connectors in the circuit breaker 100 can be connected to corresponding connectors in the switchgear 104 for testing various functionalities or features of the circuit breaker 100.

The front panel 112 of the cradle 102 includes a crank access hole 124 and a button arm 126 (also referred to as a stop/release button) that protrudes through the front panel 112. The button arm 126 is part of a conventional crank detent actuator, which has detents conventionally formed at predetermined points along its length (see FIG. 4A) to allow the button arm 126 to pop out of the panel 112 as the control screw in the cradle mechanism reaches each racking position. The front panel 112 also includes a manual crank handle storage hole 128, which will be used by the remote racking device 108 for support and supports 130a,b (FIG. 5A) to lock the remote racking device 108 in position. The front panel 112 further includes a manual position indicator 132, which indicates the racking position of the circuit breaker 100. Alternately, the supports 130a,b can be formed on a mounting plate (not shown) that is attached over the panel 112 by screws or the like to retrofit existing cradles that lack the supports 130a,b.

The remote racking device 108 includes a housing 122, a detachable drive shaft 200 (FIG. 2) extending away from the housing 122 and configured to be received by the crank access hole 124 (FIG. 1B) in the front panel 112 of the cradle 102 when the remote racking device 108 is positioned on to the front panel 112. The remote racking device 108 further includes an actuator pin 300 (FIG. 3A) extending through the housing 122 and positioned to move with the button arm 126 protruding through the panel 112 (FIG. 4A). The remote racking device includes a sensing device 202 (FIG. 2, 3A), such as a micro-switch, within the housing 122. The sensing device 202 is configured to, when the actuator pin 300 is moved by the button arm 126 transitioning from a release position to a stop position, produce a signal indicative of the position of the button arm. For example, when the circuit breaker 100 reaches the next racking position, the button arm 126 pops out (relative to the front panel 122), placing it in the stop position. To initiate the next racking operation, the button arm 126 must be pushed in (relative to the front panel 122) to place it into the release position.

The remote racking device 108 includes a motor 204 (FIG. 2) that is operably coupled to the drive 200 to cause the drive 200 to rotate within the crank access hole 124. Within the crank access hole 124 is conventionally a control screw, which when rotated, causes the circuit breaker 100 to be racked from one racking position toward another racking position. Details of this operation can be found in U.S. Pat. No. 6,160,229, mentioned above. The remote racking device 108 includes a circuit 600 (FIG. 6) that receives the signal from the sensing device 202 (FIG. 2) while the motor 204 is rotating in a forward (e.g., clockwise) or reverse (e.g., anti-clockwise) direction. When the signal indicates that the button arm 126 is in the stop position, the circuit 600 produces an output signal 602 (FIG. 6) that causes an electrical pulse in a reverse direction to the motor 204 to suppress over-driving of the motor 204, and associated mechanical linkage lock-up, during a racking operation of the circuit breaker 100. The output signal 602 has a predetermined duration that is selected to overcome an inertia of the motor 204 having a load corresponding to the circuit breaker 100 (which can weigh hundreds of pounds) and to bring the motor 204 to a sudden stop such that over-driving of the motor 204 is suppressed or prevented. As the motor 204 is rotating in a forward or reverse direction (depending on the desired racking operation) under a heavy load corresponding to the circuit breaker 100, it has an inertia such that when the motor 204 is instructed to stop, the inertia will cause the load (i.e., circuit breaker 100) to continue to move in the direction that it was traveling even after the motor 204 is de-energized. When this occurs, damage to the cradle mechanism can occur or the cradle mechanism can become locked or the motor 204 can become undesirably over-torqued.

To avoid or minimize these undesirable conditions, the present disclosure proposes to reverse the direction of the motor 204 for a predetermined duration of time sufficient to brake the motor 204 suddenly, and reverse its direction slightly, such as by a few degrees, for example 2-5 degrees. For example, when the circuit breaker 100 is a MASTER-PACT® circuit breaker from Schneider Electric, it has been found that a pulse duration of 55 milliseconds in which the direction of the motor 204 is reversed is sufficient to brake the motor 204 and prevent damage to or locking up of the cradle mechanism. The duration of the output signal 602 can be determined as a function of any one or more of the torque of the motor 204, the weight of the load attached to the motor 204, and the rotation angle of the motor 204, for example.

As mentioned above, the remote racking system 106 also includes the remote control device 110, which is communicatively coupled to and physically separated by a distance from the remote racking device 108. This distance is selected so that the operator operating the remote control device 110 is located a safe distance, such as 30 feet, away from the circuit breaker 100 while performing a racking operation. The remote control device 106 includes a switch assembly (also referred to as a motor direction switch) 118a (FIG. 6), which is part of the controls 118 accessible from the housing 116 of the remote control device 110. The switch assembly 118a receives the output signal 602 from the circuit 600. The operator uses the switch assembly 118a to cause the drive 200 to rotate in a forward or a reverse direction as a function of a position of the switch assembly 118a. The remote control device 110 also includes a control 118b that, when actuated, causes the button arm 126 to transition from the stop position to the release position. For example, the control 118b can be a solenoid switch that when actuated causes the button arm 126 to be pushed in (relative to the front panel 112), changing the position of the button arm 126 from the stop position to the release position. Details of how the control 118b is operable to change the position of the button arm 126 are described in more detail below, particularly in connection with FIG. 6. The drive 200 is mechanically prevented from racking the circuit breaker 100 into or out of the switchgear 104 when the button arm 126 is in the stop position. By contrast, the drive 200 is mechanically operable or permitted to rack the circuit breaker 100 among various racking positions when the button arm 126 is in the "pushed-in" release position until the button arm 126 transitions to the "popped-out" stop position.

Although the remote racking device 108 is communicatively coupled to the remote control device 110 by the electrical cable 114, alternately, the remote racking device 108 can be wirelessly coupled to the remote control device 110, using any conventional wireless protocol that permits the operator to be a safe distance, such as at least 30 feet, away from the circuit breaker 100 while performing a racking operation.

Figure 2:
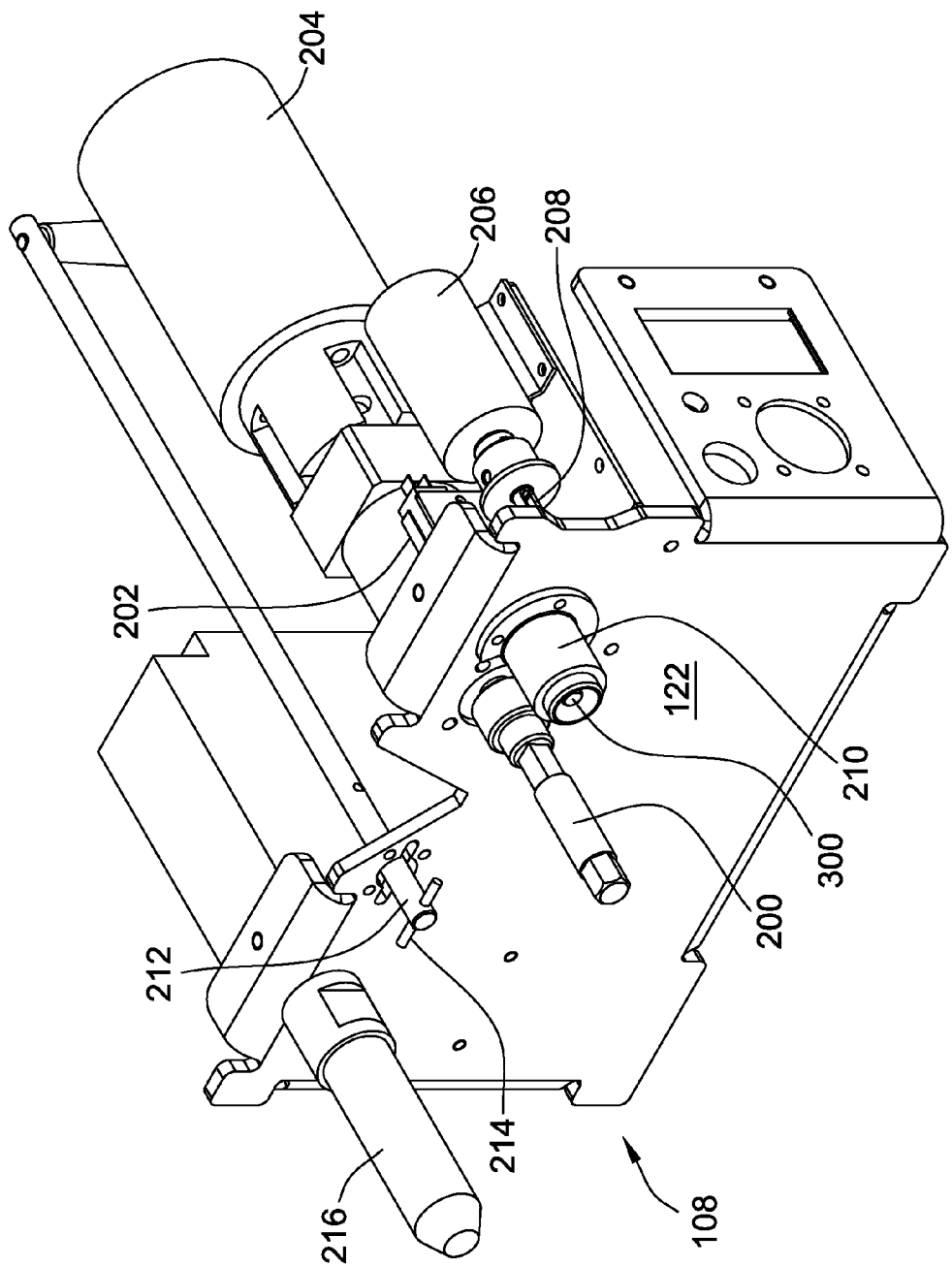
FIG. 2 is a perspective view of part of the remote racking device showing a protruding drive and actuator pin.
Figure 3A:
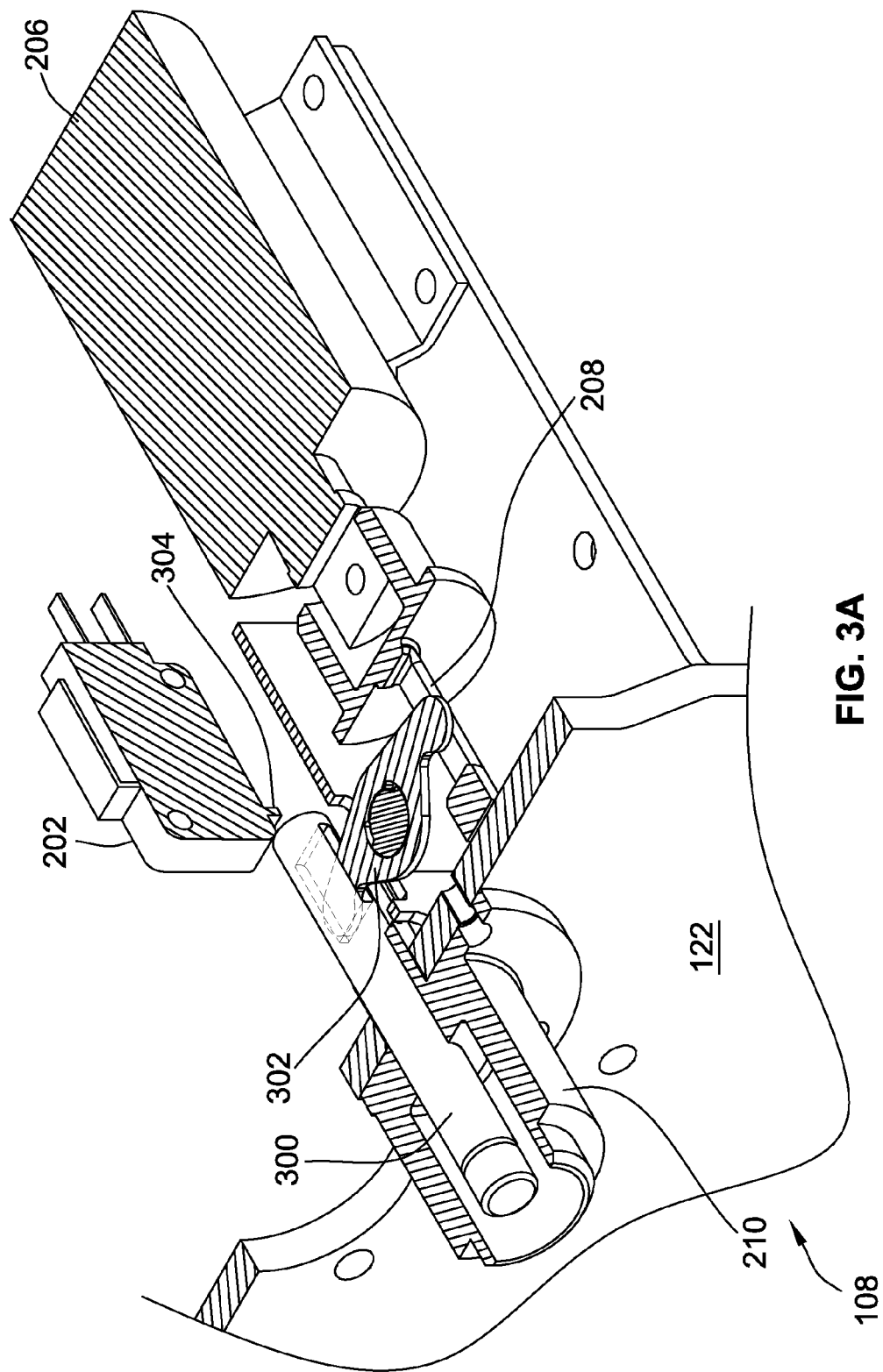
FIG. 3A is a perspective, partial cutaway front view of an actuator guide and actuator pin in relation to a sensing device, a rotating member, and a solenoid.
Figure 3B:
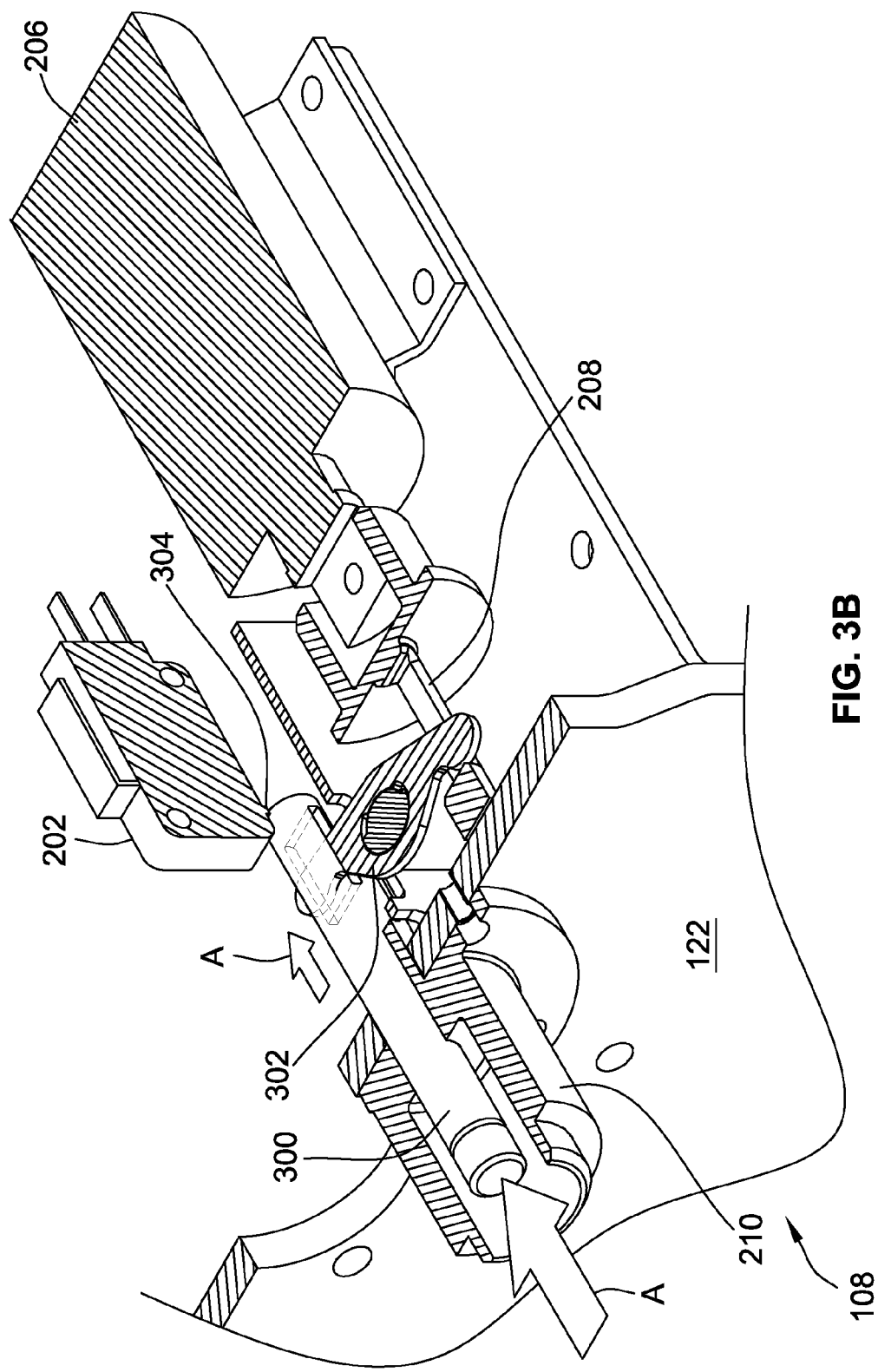
FIG. 3B illustrates the actuator pin shown in FIG. 3A in a refracted position relative to the housing of the remote racking device.
Figure 3C:
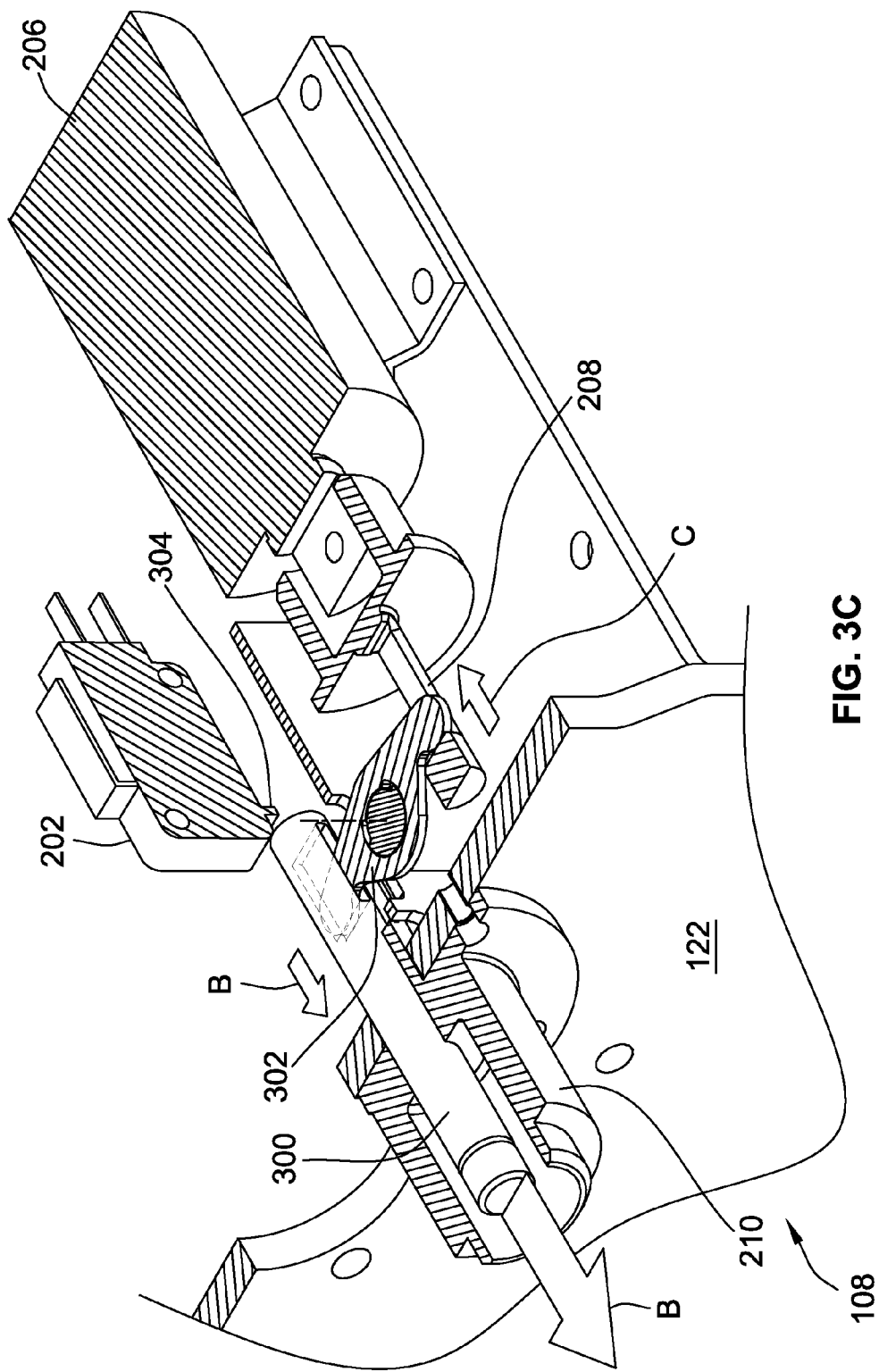
FIG. 3C illustrates the actuator pin shown in FIG. 3A in an extended position relative to the housing of the remote racking device.
Figure 4A:
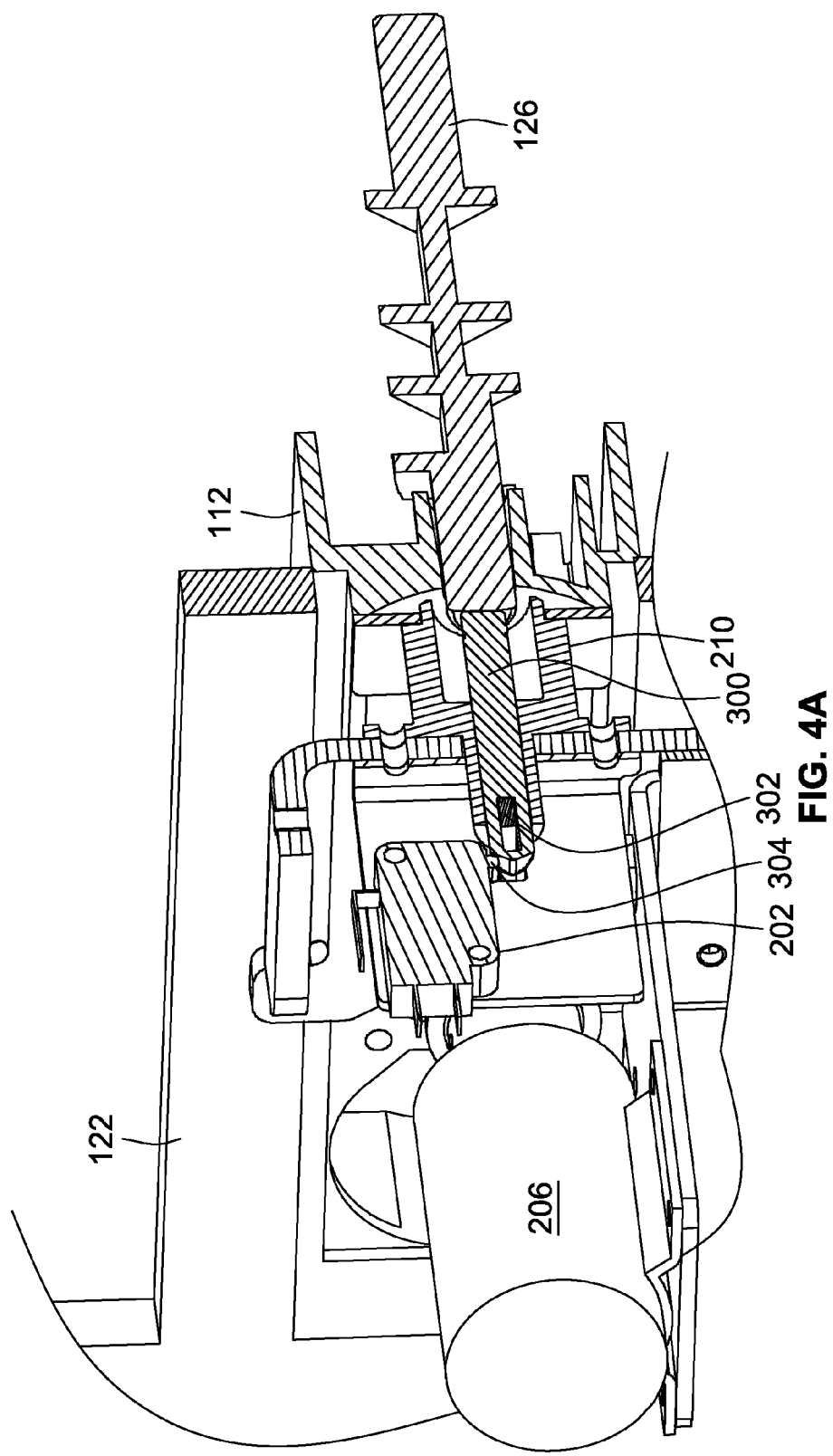
FIG. 4A is a perspective, partial cutaway rear view of part of the remote racking device showing the interaction of the actuator pin and the button arm from the cradle of the circuit breaker when the button arm is in the release position.

As shown in FIG. 2, the remote racking device 108 includes a solenoid 206 having a plunger 208 (seen more clearly in FIGS. 3A-3C). A rotating member 302 (FIG. 3A), such as a bell crank, is mechanically coupled between the actuator pin 300 and the plunger 208 of the solenoid 206. When the solenoid 206 is actuated, the plunger 208 moves to cause the rotating member 302 to rotate, thereby pushing the actuator pin 300 away from the housing 122 in the direction of arrow B, which causes the button arm 126 to be transitioned from the stop position to the release position (compare FIG. 3B with FIG. 3C). The sensing device 202 (seen in FIG. 3A) is positioned in a movement path (indicated by the arrow A in FIG. 3B) of the actuator pin 300 so that a toggling element 304 of the sensing device 202 switches between an open and a closed position when the actuator pin 300 engages the toggling element 304.

Figure 5A:
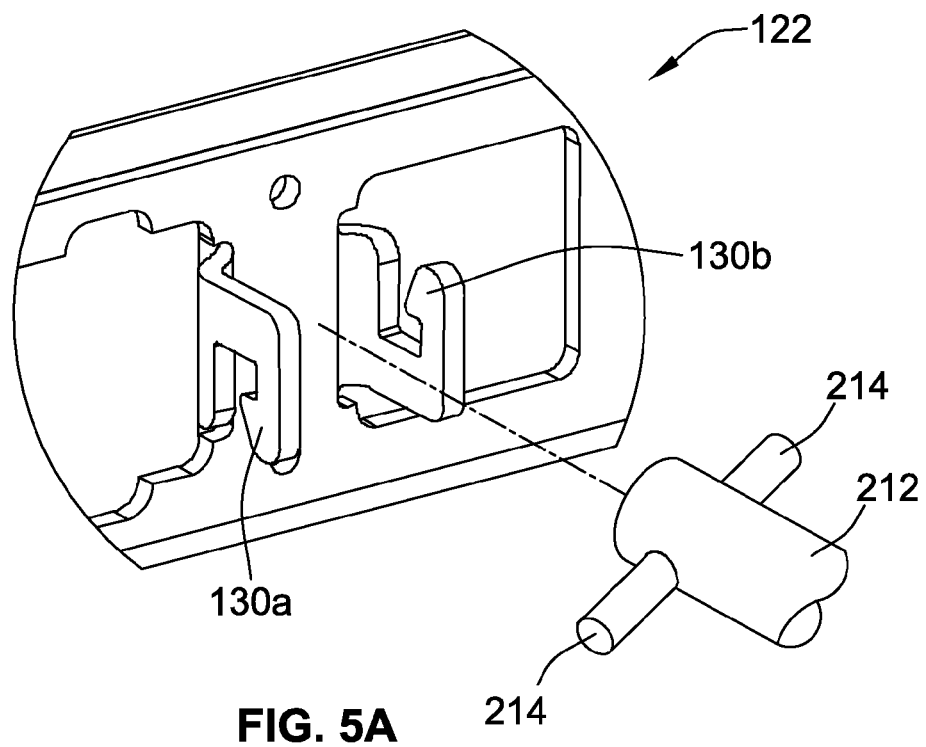
FIG. 5A illustrates a locking mechanism to lock the remote racking device in position once attached to the cradle.
Figure 5B:
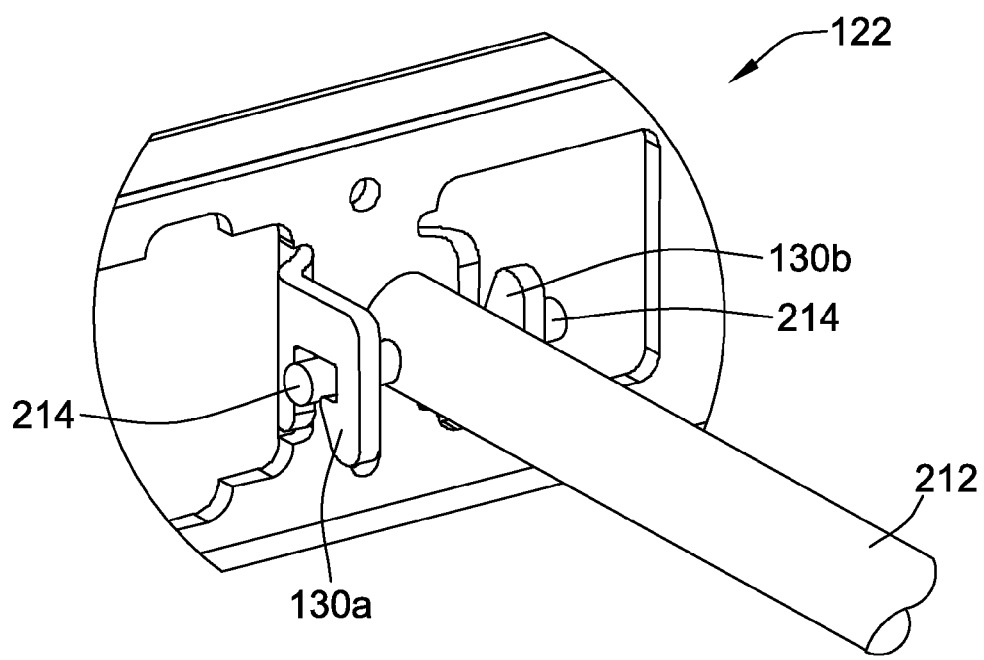
FIG. 5B illustrates the locking mechanism to hold the remote racking device in position on the panel of the circuit breaker cradle.

The remote racking device 108 includes an actuator guide 210 (FIG. 2) protruding through the housing 122 and configured to cover the button arm 126 (see FIG. 4A) when the remote racking device 108 is mechanically coupled to the cradle 102. The remote racking device 108 is mechanically coupled to the cradle 102 (and thereby the switchgear 104) by at least a support member 212 (FIG. 2) that protrudes through the housing 122 of the remote racking device 108. The remote racking device 108 is also mechanically coupled to the cradle 102 by a support guide 216 that extends into the crank handle storage hole 128 formed in the panel 112 of the cradle 102 that houses the circuit breaker 100. The member 212 includes a pin 214 inserted into an end thereof as shown in FIG. 2, the pin 214 being securely received in the racking device supports 130a,b to lock the remote racking device 108 in position relative to the cradle 102 while racking operations are being performed (FIGS. 5A-5B).

Figure 1B:
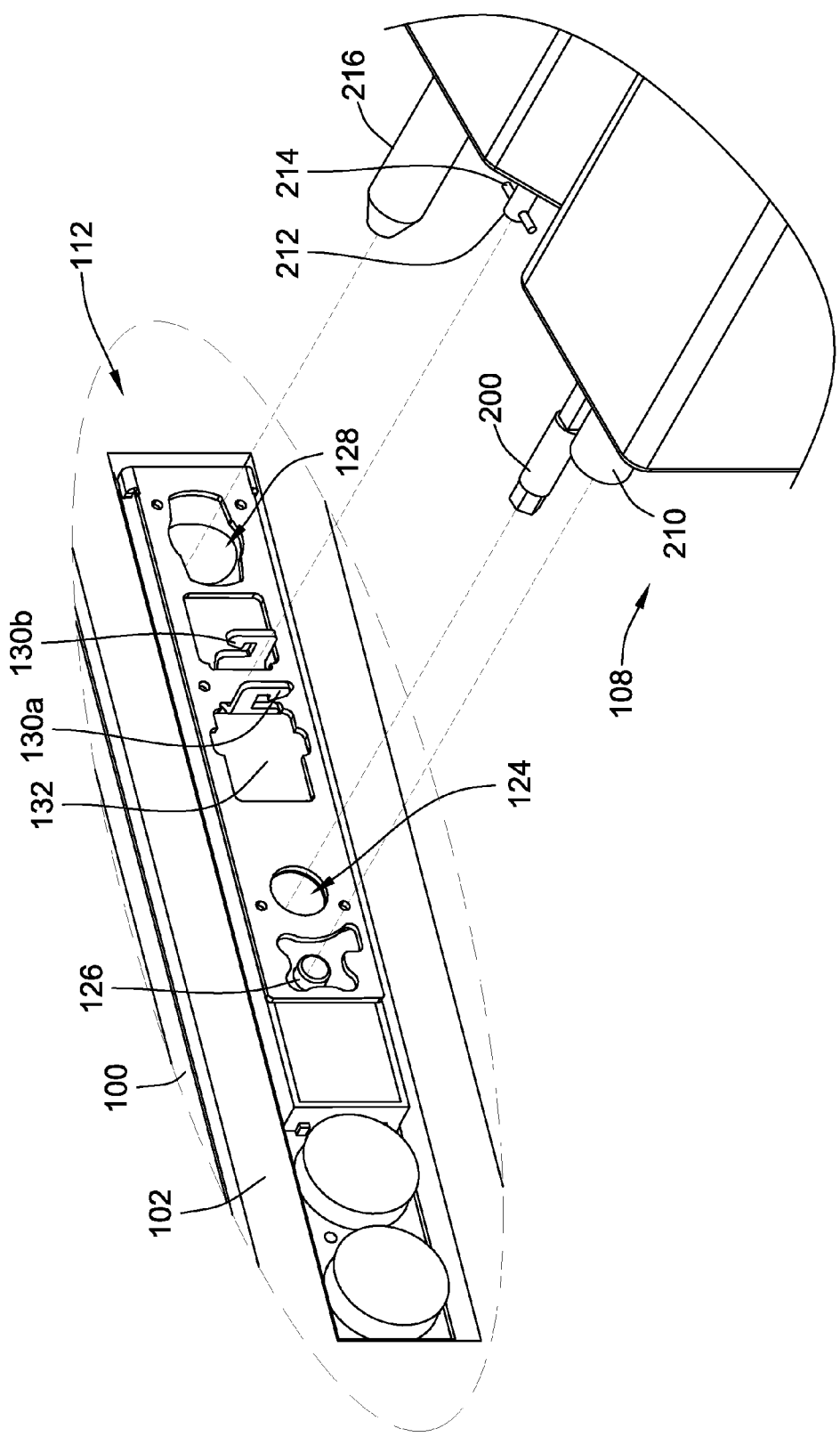
FIG. 1B is a close-up perspective view of the panel of the cradle of the circuit breaker shown in FIG. 1A positioned to receive corresponding members of the remote racking device shown in FIG. 1A.

To mount or mechanically couple the remote racking device 108 into the panel 112 of the cradle 102, the operator first installs the detachable drive 200 and then aligns any one or more of the support guide 216, the drive 200, or the actuator guide 210 with the corresponding hole 128, the crank access hole 124, or over the button arm 126 in the panel 112, such as shown by the dashed lines in FIGS. 1A and 1B. When mounted, the remote racking device 108 is flush against the panel 112. Once the support guide 216 is received in hole 128 and the drive 200 is received in the crank access hole 124, the operator twists a handle 134 mechanically coupled to the pin 214 to rotate the pin 214 as shown in FIG. 5A until the pin 214 is securely received between the supports 130a,b. These racking device supports 130a,b as well as the support guide 216 help to carry the weight of the remote racking device 108 when it abuts against the cradle 102. The operator connects the electrical cable 114 between the remote racking device 108 and the remote control device 110.

Initially, when the circuit breaker 100 is mounted into the switchgear 104, the button arm 126 is in a "popped-out" position, which represents the stop position. Even if a manual crank (not shown) is inserted into the crank access hole 124, the operator will be mechanically prevented from rotating the crank and thereby racking the circuit breaker 100 into the switchgear 104. In this initial configuration, the circuit breaker 100 is in the disconnect racking position. To initiate a racking operation, for example, from the disconnect position to the test position, the button arm 126 needs to be changed from its original "popped-out" or extended position (representing the stop position) to the "pushed-in" or depressed position corresponding to the release position. To do so, the operator actuates the control 118b on the remote control device 110 (at a safe distance away from the circuit breaker 100), which causes the solenoid 206 to pull the plunger 208 in the direction of arrow C shown in FIG. 3C, which rotates the bell crank 302 in a counterclockwise direction, which in turn causes the actuator pin 300 to extend away from the housing 122 in the direction of arrow B, which is opposite the direction of arrow C. The actuator pin 300 pushes against the button arm 126, pushing it to the release position (see FIG. 4A).

Figure 4B:
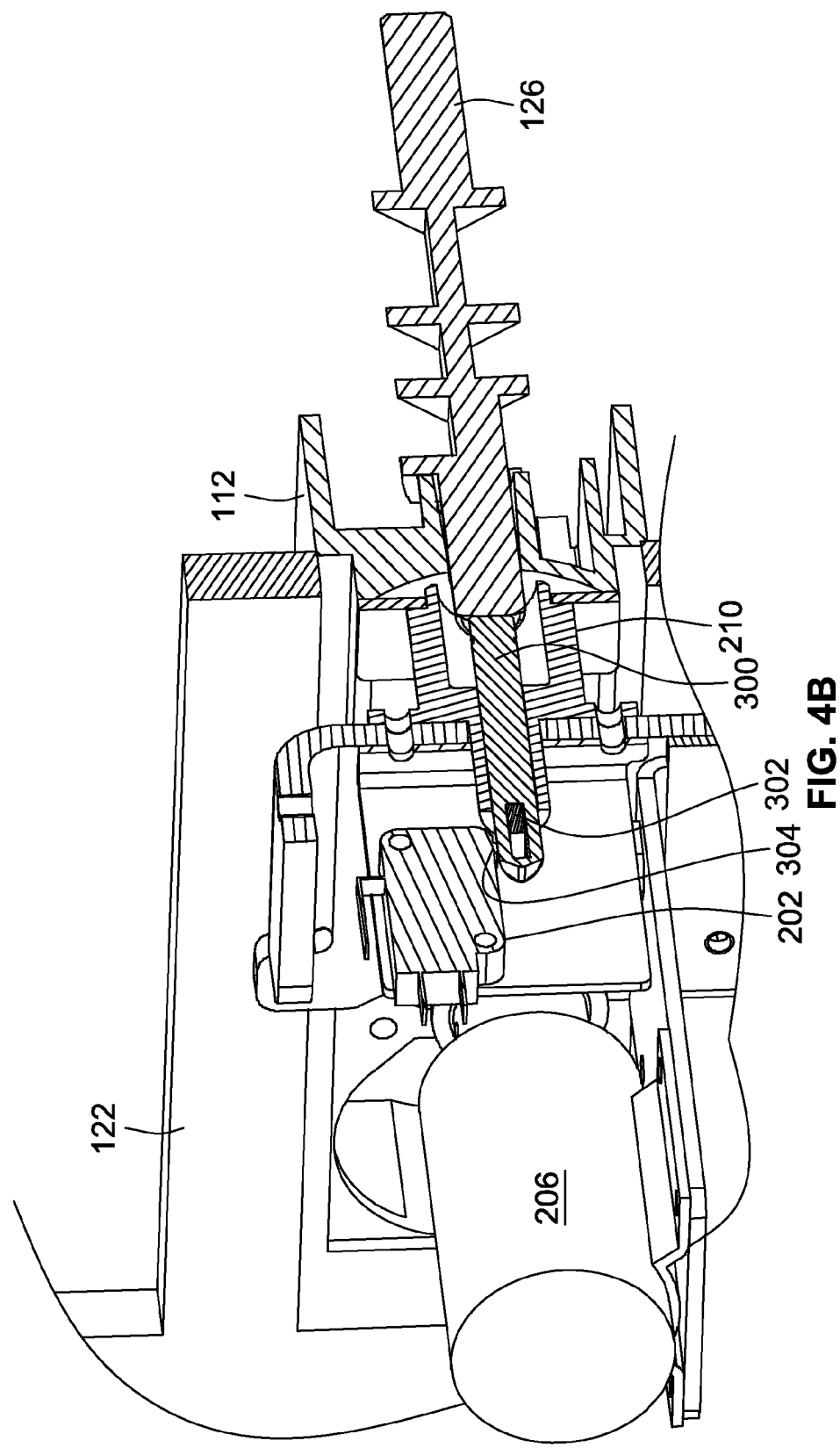
FIG. 4B illustrates the button arm of FIG. 4A in the stop position and the relative position of the actuator pin and a toggle element of the sensing device.

The operator actuates the motor direction switch 118a to indicate whether to rotate the motor 204 in a forward (e.g., clockwise) direction (such that the circuit breaker 100 is racked into the switchgear 104 into a connected position, referred to as racking on) or in a reverse direction (such that the circuit breaker 100 is racked out of the switchgear 104 into a disconnect position, referred to as racking off). In this example, the operator puts the motor direction switch 118a into the forward position and actuates a motor run switch 118d on the remote control device 110. As can be seen from FIG. 6, closing the motor run switch 118d, which connects a power supply 604 to a forward relay 614, which closes to allow the power supply 604 to run the motor 204 in a direction that causes the circuit breaker 100 to begin to move from the disconnect position to a test position. When the circuit breaker 100 reaches the test position, the cradle mechanism causes the button arm 126 to "pop out" from its release position to the stop position, such as shown in FIGS. 4A and 4B. This triggers a sequence of mechanical and electrical actions. Mechanically, the button arm 126 pushes the actuator pin 300 into the housing 122, such as shown in FIG. 4B, until the actuator pin 300 actuates the toggling element 304 of the sensing device 202, which closes a circuit shown in FIG. 6 by applying a signal along the input line 616, triggering the electrical actions.

Figure 6:
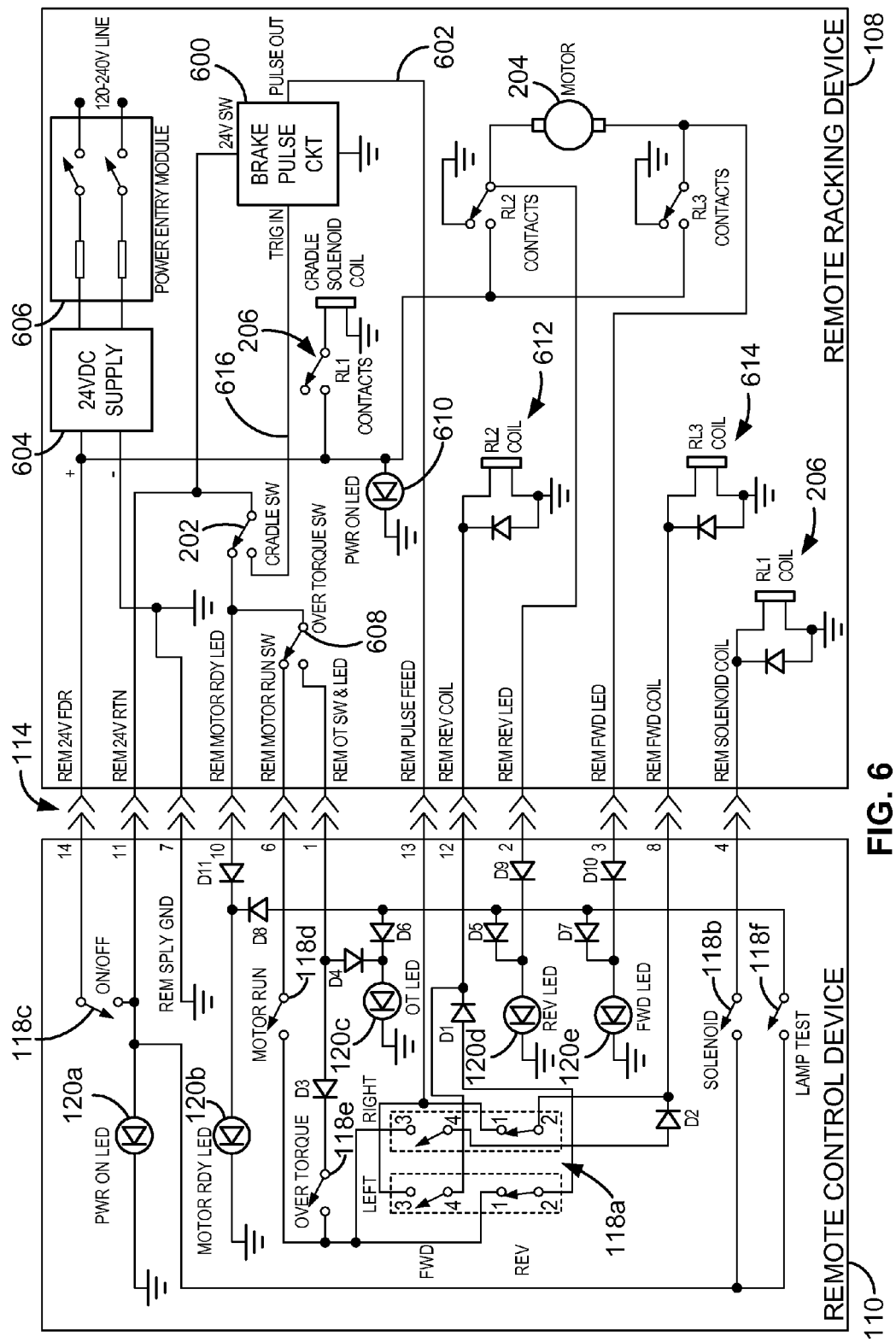
FIG. 6 is a circuit wiring diagram of example circuits in the remote racking device and the remote control device and their associated electronic components.

Referring to FIG. 6, a brief explanation of the electrical components will be described, followed by exemplary procedures for carrying out racking operations using the remote control device 110 and the remote racking device 108. FIG. 6 is an exemplary wiring diagram showing various electrical and electromechanical components in the remote racking device 108 and the remote control device 110, which are connected together by the corresponding electrical connectors on the cable 114. In FIG. 6, the terms or abbreviations mean the following: "REM" refers to remote, "OT" refers to overtorque, LED refers to light emitting diode, RL refers to relay, REV refers to reverse, FWD refers to forward, RDY refers to ready, SPLY refers to supply, VDC refers to direct current volts, CKT refers to circuit, and PWR refers to power. Referring to the circuit of the remote racking device 108, the components shown in the remote racking device 108 can be disposed on one or more printed circuit boards. A power supply 604, such as a 24 VDC supply, provides power to the components in the remote racking device 108 and the remote control device 110. Alternately, the remote control device 110 can have its own power source independent of the power supply 604. The power supply 604 derives its 24 VDC supply from a power entry module 606, which is connected to a 120V or 240V alternating current (AC) line. This supply line can be independent from or derived from the supply line or lines supplied to the circuit breaker 100. A power on LED 610 is connected to the output of the power supply 604 and turns on when the power supply 604 produces a 24 VDC output. A switch labeled cradle switch in FIG. 6 corresponds to the sensing device 202 shown in FIGS. 3A-3C, for example. One of the poles of the sensing device 202 is connected along an input line 616 to a circuit 600 labeled a brake pulse circuit in FIG. 6. The circuit 600 produces an output 602 having a waveform, such as a pulse waveform. The remote racking device 108 also includes a pair of relays 612, 614, labeled RL2 and RL3, respectively, one to cause the motor 204 to rotate in a anticlockwise/reverse direction (RL2) and the other to cause the motor 204 to rotate in a clockwise/forward direction (RL3). When energized, corresponding contacts of the relay close to apply the voltage from the power supply to the motor 204, causing the motor 204 to rotate in the direction controlled by the relays 612, 614. The remote racking device 108 further includes the solenoid 206 shown in FIGS. 3A-3C, for example, whose actuation is controlled by the remote control device 110, described below.

Referring now to the remote control device 110, the remote control device 110 includes six controls 118a-f and five indicators 120a-e. These controls and indicators are exemplary only, and more or fewer controls and indicators can be incorporated in the remote control device 110. The five indicators 120a-e can be light emitting diodes having various colors and shapes to indicate their function. For example, the power on LED 120a can be a green LED, which turns on when the control 118c is switched on, thereby connecting the remote control device 110 to the power source 604. A motor ready LED 120b can be green and turn on when the motor 204 is ready to be run. To do so, the operator actuates the motor run control 118d to connect the power supply 604 to the motor 204 through one of the relays 612 or 614. An over-torque LED can be orange and turn on when an over-torque condition in the motor 204 is sensed by the remote racking device 108. The remote racking device 108 includes a torque limiter coupled to the drive, and the torque limiter slips when the motor 204 is overtorqued, causing the over-torque switch 608 to close. When this occurs, the operator should determine the cause of the over-torque condition and make the appropriate corrections or adjustments and then actuate the over-torque control 118e to continue rotating the motor 204, typically a few degrees, until the normal operating mode is reached, which will cause the over-torque switch 608 to toggle (into the position shown in FIG. 6). Reverse and forward LEDs 120d,e can be in the shape of arrows pointing to the left and to the right, for example, to indicate a direction of the desired racking operation. Suitable labels can be printed proximate the indicators 120a-e and the controls 118a-f to indicate their function. A solenoid control 118b actuates the solenoid 206 as explained above. A lamp test control 118f can be pressed to ensure that all of the indicators 120a-e are functioning properly. When the lamp test control 118f is actuated, all of the indicators 120a-e should illuminate to indicate that they have not burned out.

Having described the components of the circuits shown in FIG. 6, attention will now be drawn to a few examples of carrying out racking operations using the remote control device 110 to control the remote racking device 108. Closing the switch 202 (which can occur, for example, when the button arm 126 pops out of the panel 112 of the cradle 102) connects the input line 616 of the brake pulse circuit 600 to the power supply 604. The brake pulse circuit 600 outputs a pulse having a duration, such as 55 milliseconds on the output 602, which, when the motor direction switch 118a is connected in the clockwise/forward direction, connects the output 602 to a reverse relay 612. Contacts of the reverse relay 612 close (the contacts of the forward relay 614 were opened when the switch 202 transitions to the stop position), causing to provide current to the motor 204 to reverse direction for the duration of the output pulse 602, such as 55 milliseconds. When the pulse ends, power is removed from the reverse relay 612, causing the motor 204 to stop. The circuit breaker 100 can be observed to come to a sudden, hard stop.

To ready the remote racking device 108 to perform the next racking operation, the operator actuates the solenoid switch 118b to cause the actuator pin 300 to push the button arm 126 into the release position. If the operator wants to perform a racking out operation, the operator puts the motor direction switch 118a into the anticlockwise/reverse position, which connects the contacts 1,2 shown in FIG. 6 and disconnects the contacts 3,4. The operator presses the motor run switch 118d on the remote control device 110, which closes a circuit between the power supply 604 through the reverse contacts 1,2 of the motor direction switch 118a, and the reverse relay 614. The contacts of the relay 614 close, causing the motor 204 to start rotating in the reverse (e.g., anticlockwise) direction until the button arm 126 pops out from its release position to the stop position, causing the power supply 604 to be connected to the input line 616 to the brake pulse circuit 600, which outputs a pulse as an output signal 602, which activates the forward relay 614 and closes its associated contacts to cause the motor 204 to reverse its direction for the duration of the output signal 602.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. A remote racking system for racking a circuit breaker into and out of an electrical switchgear, comprising:
   a remote racking device that includes:
      a housing;
      a drive extending away from the housing and configured to be received by a crank access hole in a front panel of a cradle housing the circuit breaker when the remote racking device is positioned to abut the front panel;
      an actuator pin extending through the housing and positioned to move with a button arm when the remote racking device abuts the front panel, the button arm being accessible from the front panel and having a release position and a stop position; and
      a sensing device in the housing and configured to, in response to the actuator pin being moved by the button arm transitioning from the release position to the stop position, produce a signal indicative of the position of the button arm.

2. The system of claim 1, wherein the remote racking device further includes:
   a motor operably coupled to the drive to cause the drive to rotate within the crank access hole, thereby causing the circuit breaker to be racked into or out of the switchgear among a plurality of positions; and
   a circuit that receives the signal from the sensing device while the motor is rotating in a direction, and, responsive to the signal indicating the stop position, produces an output signal that causes the motor to reverse the direction to suppress over-driving of the motor during a racking operation of the circuit breaker.

3. The system of claim 2, wherein the circuit produces the output signal for a predetermined duration that is selected to overcome an inertia of the motor having a load corresponding to the circuit breaker and to bring the motor to a sudden stop such that over-driving of the motor is suppressed or prevented.

4. The system of claim 1, further comprising:
   a remote control device communicatively coupled to and physically separated by a distance from the remote racking device, the remote control device including:
      a housing; and
      a switch assembly that receives the output signal from the circuit, the switch assembly operable to cause the drive to rotate in a clockwise or anticlockwise direction as a function of a position of the switch assembly.

5. The system of claim 1, further comprising:
   a remote control device communicatively coupled to and physically separated by a distance from the remote racking device, the remote control device including:
      a housing; and
      a control operable, when actuated, to cause the button arm to transition from the stop position to the release position.

6. The system of claim 5, wherein the remote control device is communicatively coupled to the remote racking device by an electrical cable having a length sufficient to keep an operator of the remote control device a distance away from the switchgear while carrying out a racking operation.

7. The system of claim 5, wherein the remote racking device further includes:
   a solenoid having a plunger;
   a rotating member mechanically coupled between the actuator pin and the plunger,
   wherein actuation of the solenoid moves the plunger to cause the rotating member to rotate, thereby pushing the actuator pin away from the housing, thereby causing the button arm to be transitioned from the stop position to the release position, and wherein the sensing device is positioned in a movement path of the actuator pin; and
   wherein the remote control device further includes a solenoid switch operable to actuate the solenoid.

8. The system of claim 5, wherein the remote control device further includes a switch assembly that receives the output signal from the circuit, the switch assembly operable to cause the drive to rotate in a clockwise or anticlockwise direction as a function of a position of the switch assembly.

9. The system of claim 5, wherein the control is a switch.

10. The system of claim 1, wherein the remote racking device further includes:
- a solenoid having a plunger;
- a rotating member mechanically coupled between the actuator pin and the plunger,
- wherein the plunger of the solenoid causes the rotating member to rotate, thereby pushing the actuator pin away from the housing, thereby causing the button arm to be transitioned from the stop position to the release position, and
- wherein the sensing device is positioned in a movement path of the actuator pin.

11. The system of claim 1, wherein the sensing device is a micro-switch.

12. The system of claim 1, wherein the drive is mechanically prevented from racking the circuit breaker relative to the switchgear in response to the button arm being in the stop position, and wherein the drive is mechanically operable to rack the circuit breaker relative to the switchgear in response to the button arm being in the release position until the button arm transitions to the stop position.

13. A remote racking system for racking a circuit breaker into and out of an electrical switchgear, comprising:
- a remote racking device that includes:
  - a housing;
  - a drive protruding through the housing and configured to be received by a crank access hole in a front panel of a cradle that houses the circuit breaker in response to the remote racking device being mechanically coupled to the switchgear;
  - a motor within the housing and operably coupled to the drive to cause the drive to rotate within the crank access hole, thereby causing the circuit breaker to be racked into or out of the switchgear among a plurality of racking positions;
  - a sensing device within the housing and configured to, in response to the button arm transitioning from a release position to a stop position, produce a signal indicative of the position of the button arm; and
  - a circuit that receives the signal from the sensing device while the motor is rotating in a direction, and, responsive to the signal indicating that the button arm is in the stop position, produces an output signal that causes the motor to reverse the direction to suppress over-driving of the motor while racking the circuit breaker from one of the racking positions to another; and
- a remote control device communicatively coupled to the remote racking device, the remote control device including:
  - a housing physically distinct from the housing of the remote racking device; and
  - a control operable to cause the button arm to transition from the stop position to the release position in response to the control being actuated.

14. The system of claim 13, wherein the remote racking device further includes:
- an actuator pin extending through the housing of the remote racking device and contacting the button arm when the remote racking device is mechanically coupled to the switchgear.

15. The system of claim 14, wherein the remote racking device further includes:
- a solenoid having a plunger;
- a rotating member mechanically coupled between the actuator pin and the plunger,
- wherein the plunger of the solenoid causes the rotating member to rotate, thereby pushing the actuator pin away from the housing, thereby causing the button arm to be transitioned from the stop position to the release position, and
- wherein the sensing device is positioned in a movement path of the actuator pin.

16. The system of claim 15, wherein the control controls actuation of the solenoid.

17. The system of claim 16, wherein the remote racking device further includes an actuator guide protruding through the housing and configured to cover the button arm in response to the remote racking device being mechanically coupled to the switchgear.

18. The system of claim 13, wherein the remote racking device is mechanically coupled to the switchgear by at least a support guide that protrudes through the housing of the remote racking device and extends into a corresponding racking mounting bracket hole in the panel.

19. The system of claim 13, wherein the circuit produces the output signal for a predetermined duration that is selected to overcome an inertia of the motor having a load corresponding to the circuit breaker and to bring the motor to a stop without over-driving the motor under a load corresponding to the circuit breaker, wherein the motor reverses the direction for at least the predetermined duration.

20. The system of claim 13, wherein the remote control device further includes a switch assembly that receives the output signal from the circuit, the switch assembly operable to cause the drive to rotate in clockwise or anticlockwise direction as a function of a position of the switch assembly, wherein the remote control device is physically separated by a distance from the remote racking device to allow an operator to operate the remote racking device remotely via the remote control device.

* * * * *